US008700386B2

(12) United States Patent
Minami et al.

(10) Patent No.: US 8,700,386 B2
(45) Date of Patent: Apr. 15, 2014

(54) INFORMATION PROCESSING APPARATUS, INFORMATION PROCESSING METHOD, AND PROGRAM

(75) Inventors: Setsushi Minami, Tokyo (JP); Naoki Kamimaeda, Kanagawa (JP)

(73) Assignee: Sony Corporation, Tokyo (JP)

( * ) Notice: Subject to any disclaimer, the term of this patent is extended or adjusted under 35 U.S.C. 154(b) by 579 days.

(21) Appl. No.: 13/016,533

(22) Filed: Jan. 28, 2011

(65) Prior Publication Data

US 2011/0196669 A1 Aug. 11, 2011

(30) Foreign Application Priority Data

Feb. 5, 2010 (JP) ................................ P2010-024585

(51) Int. Cl.
*G06F 17/20* (2006.01)

(52) U.S. Cl.
USPC .......................... 704/9; 704/7; 704/8; 704/10

(58) Field of Classification Search
USPC ........................................................ 704/7–10
See application file for complete search history.

(56) References Cited

U.S. PATENT DOCUMENTS

2009/0073314 A1* 3/2009 Uemukai et al. .............. 348/468

FOREIGN PATENT DOCUMENTS

JP 2002 27416 1/2002
JP 2007 208365 8/2007

* cited by examiner

*Primary Examiner* — Leonard Saint Cyr
(74) *Attorney, Agent, or Firm* — Wolf, Greenfield & Sacks, P.C.

(57) ABSTRACT

There is provided an information processing apparatus including: an acquiring unit acquiring a title of content; an analyzing unit dividing the title into tokens; a calculating unit calculating, for each token, an evaluation value based on a token length and weighted according to the token's position in the title; a mapping unit mapping, for each token, a token point shown by an ordinal number showing the token's position in the title and the evaluation value, onto a coordinate plane; a deciding unit deciding, based on the mapped token points, coordinates of a criterion point used as a criterion for extracting a series identifier and an extraction criterion based on the criterion point; an extracting unit extracting token points that conform to the extraction criterion out of the token points; and a generating unit generating the series identifier from the character strings included in tokens associated with the extracted token points.

14 Claims, 8 Drawing Sheets

INFORMATION PROCESSING APPARATUS, INFORMATION PROCESSING METHOD, AND PROGRAM

BACKGROUND OF THE INVENTION

1. Field of the Invention

The present invention relates to an information processing apparatus, an information processing method, and a program.

2. Description of the Related Art

Television or radio programs, movies, newspaper or magazine articles and books all include content in the form of series where a number of installments are provided with a certain intent. Among television and radio programs, as examples, some series are composed of programs broadcast at the same time every day, while others have programs broadcast on the same day and at the same time every week. Some programs broadcast on an irregular schedule are also referred to as a "series". For movies, a sequel would be one example of an installment in a series as referred to here. Information showing that content is an installment in a series is valuable in that such information can be used in various ways.

For example, Japanese Laid-Open Patent Publication No. 2007-208365 discloses an information processing apparatus that focuses on "recurring programs", which are programs broadcast on a recurring schedule such as at the same time every day or at the same time every week, out of various types of series and uses information which indicates a series and is included in EPG (Electronic Program Guide) data to distinguish whether a given program forms part of a series. This information processing apparatus has a function that updates user preference information when the given program forms part of a series using keywords included in both the EPG data of the given program and the EPG data of one or more previous installments of the same series as the given program that have already been broadcast.

However, the information processing apparatus disclosed in Publication No. 2007-208365 cannot be used in applications where information showing whether a program forms part of a series is not included in the EPG data. Here, an apparatus that extracts content in a series using content titles would be conceivable. In many cases, the titles of programs or other content in a series include a series name that is commonly assigned to the installments of the series. As one particular example, Japanese Laid-Open Patent Publication No. 2002-27416 discloses a program reserving apparatus that is capable of extracting programs in a series when the titles of the installments in the series have been linked to a series name using "series expressions" indicating that programs belong to a series. This program reserving apparatus extracts programs as programs in a series when main titles, which are produced by excluding characters that match the series expressions set in advance from titles of programs, match one another.

SUMMARY OF THE INVENTION

However, the program reserving apparatus disclosed in Publication No. 2002-27416 has a problem in that it is necessary to set in advance every pattern of series expressions that are expected to be used as expressions indicating that programs belong to a series as a priori knowledge. In particular, since such a priori knowledge differs from language to language, it is necessary to investigate different a priori knowledge for each language.

For this reason, the present invention was conceived in view of the problem described above and aims to provide a novel and improved information processing apparatus, information processing method, and program that do not require a priori knowledge and are capable of extracting a series identifier for identifying a series for series content (i.e., content in a series) from the titles of content.

According to an embodiment of the present invention, there is provided an information processing apparatus including a title acquiring unit acquiring a title character string showing a title of content, a title analyzing unit analyzing the title character string acquired by the title acquiring unit and dividing the title character string into a plurality of tokens, an evaluation value calculating unit calculating, for each of the plurality of tokens, an evaluation value that is based on a character string length of the token and is weighted in accordance with a position of the token in the title character string, a mapping unit mapping, for each of the plurality of tokens, a token point, whose position is shown by a value of an ordinal number showing the position of the token in the title character string and the evaluation value, onto a coordinate plane, an extraction criterion deciding unit deciding, based on coordinates of the token points mapped onto the coordinate plane by the mapping unit, coordinates of a criterion point used as a criterion for extracting an identifier that identifies a series from the title and an extraction criterion based on the criterion point, an extracting unit extracting token points that conform to the extraction criterion out of the token points, and an identifier generating unit generating the identifier from the character strings included in tokens associated with the token points extracted by the extracting unit.

According to the above configuration, it is possible to extract a series identifier for identifying a series from a title character string of content. Here, by analyzing the title character string of the content, the title character string is divided into a plurality of tokens. Evaluation values are then calculated for each token based on the character string length and ordinal number of the token and the tokens to be extracted as part of the series identifier are decided based on the evaluation values. By joining the extracted tokens, the series identifier is generated. That is, the longer the length of the character string of a token, the higher the evaluation value and the closer a token is positioned to the start of the title character string, the higher the evaluation value. This means that the longer the character string length of a token and the closer the position of the token to the start, the more likely such token will be used as part of a series identifier. Since in many cases, a series name is inserted at a position near the start of a title character string, there is an effect that it becomes easier to extract a character string expressing a series. At this time, since a priori knowledge such as a dictionary is not required to extract a series identifier, there are effects in that it is not necessary to consider the updating of a priori knowledge and that it is not necessary to prepare new a priori knowledge when the present invention is applied to a different language.

The extraction criterion deciding unit may decide the extraction criterion based on a positional relationship between a criterion line, which passes through the criterion point on the coordinate plane and has a specified gradient, and coordinates of the token points.

The evaluation value calculating unit may weight each evaluation value using a weighting coefficient whose value is higher the lower the ordinal number of a token, and the extraction criterion deciding unit may decide the extraction criterion so as to extract token points whose evaluation values are large compared to points on the criterion line.

The extracting unit may output success/failure information showing whether extraction of token points that conform to the extraction criterion succeeded, and the information processing apparatus further comprises a feedback control unit adjusting a value of a gradient of the criterion line based on the success/failure information received from the extracting unit.

The extracting unit may be operable when a number of token points that match the extraction criterion is below a specified success/failure judgment value, to judge that extraction of the token points failed.

The feedback control unit may adjust the value of the gradient of the criterion line by one of adding a specified adjustment value to and subtracting a specified adjustment value from the value of the gradient of the criterion line.

The feedback control unit may adjust the value of the gradient of the criterion line by one of multiplying and dividing the value of the gradient of the criterion line by a specified adjustment value.

The feedback control unit may increase and decrease a success value and a failure value respectively in accordance with a number of times the success/failure information received from the extracting unit shows that extraction succeeded and a number of times the success/failure information shows that extraction failed and is operable when the success value exceeds a specified success threshold or when the failure value exceeds a specified failure threshold, to adjust the value of the gradient of the criterion line.

The feedback control unit may be operable when the success/failure information received from the extracting unit shows that extraction has succeeded consecutively for at least a certain number of times or more or when the success/failure information shows that extraction has failed consecutively for at least a certain number of times, to adjust the value of the gradient of the criterion line.

The feedback control unit may be operable when an adjustment results in the value of the gradient of the criterion line exceeding a specified gradient range, to set the value of the gradient of the criterion line at a specified initial value.

The evaluation value calculating unit may be operable when a character string length of a token is shorter than a specified minimum character string length, to omit calculation of the evaluation value and exclude the token from extraction.

The title analyzing unit may be operable when a number of tokens generated as a result of analysis is below a specified minimum number of tokens, to output the generated tokens to the identifier generating unit, and the identifier generating unit generates the identifier by combining the tokens inputted from the title analyzing unit.

Further, according to an embodiment of the present invention, there is provided an information processing method including steps of acquiring a title character string showing a title of content, analyzing the acquired title character string and dividing the title character string into a plurality of tokens, calculating, for each of the plurality of tokens, an evaluation value that is based on a character string length of the token and is weighted in accordance with a position of the token in the title character string, mapping, for each of the plurality of tokens, a token point, whose position is shown by a value of an ordinal number showing the position of the token in the title character string and the evaluation value, onto a coordinate plane, deciding, based on coordinates of the token points mapped onto the coordinate plane, coordinates of a criterion point used as a criterion for extracting an identifier that identifies a series from the title and an extraction criterion based on the criterion point, extracting token points that conform to the extraction criterion out of the token points, and generating the identifier from the character strings included in tokens associated with the extracted token points.

Further, according to an embodiment of the present invention, there is provided a program for causing a computer to carry out a process acquiring a title character string showing a title of content, a process analyzing the acquired title character string and dividing the title character string into a plurality of tokens, a process calculating, for each of the plurality of tokens, an evaluation value that is based on a character string length of the token and is weighted in accordance with a position of the token in the title character string, a process mapping, for each of the plurality of tokens, a token point, whose position is shown by a value of an ordinal number showing the position of the token in the title character string and the evaluation value, onto a coordinate plane, a process deciding, based on coordinates of the token points mapped onto the coordinate plane, coordinates of a criterion point used as a criterion for extracting an identifier that identifies a series from the title and an extraction criterion based on the criterion point, a process extracting token points that conform to the extraction criterion out of the token points, and a process generating the identifier from the character strings included in tokens associated with the extracted token points.

According to the embodiments of the present invention described above, it is possible to extract a series identifier for identifying a series of programs or other content that form a series from the titles of the content without requiring a priori knowledge.

DETAILED DESCRIPTION OF THE EMBODIMENTS

Figure 1:
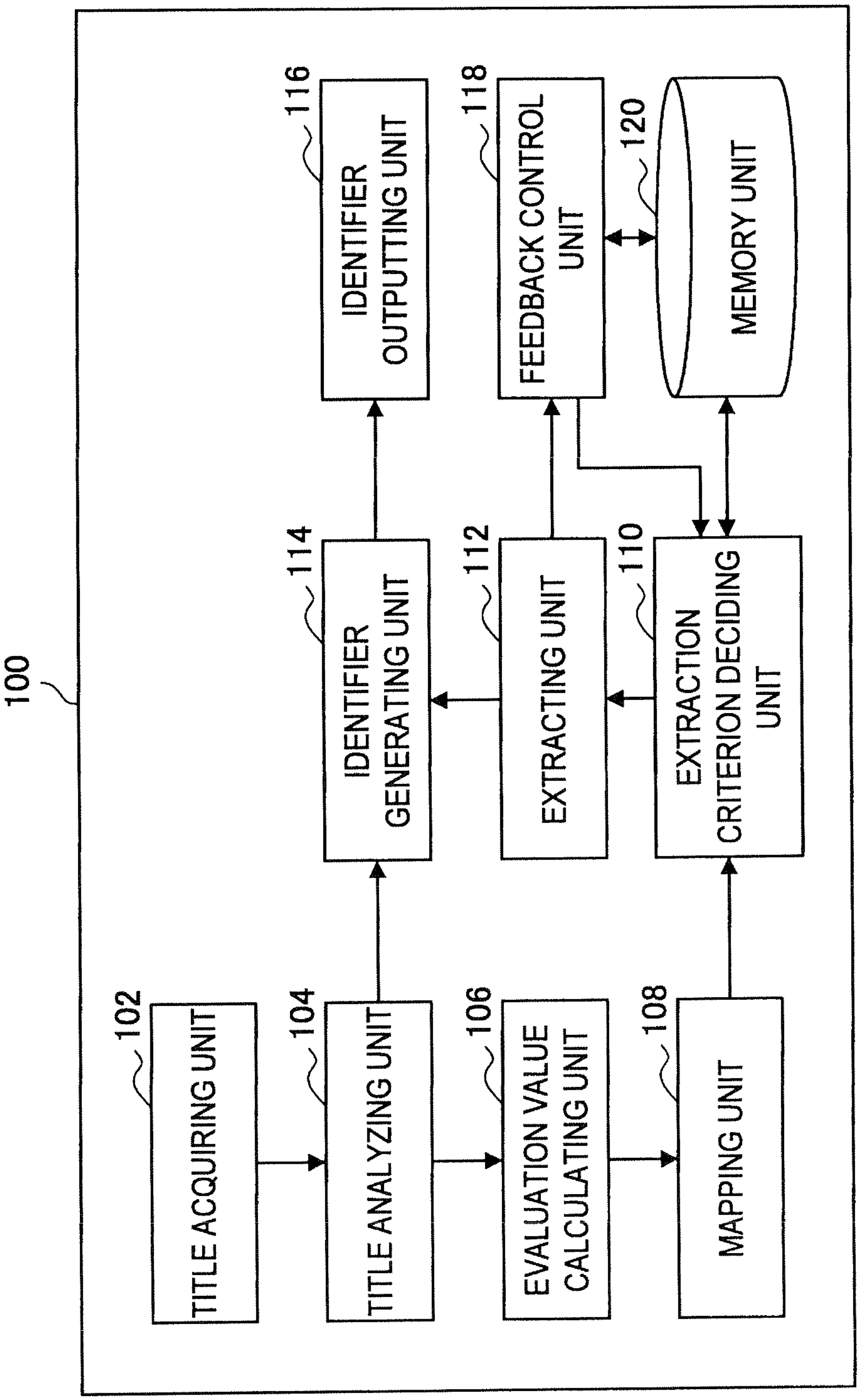
FIG. 1 is a functional block diagram showing the configuration of an information processing apparatus according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The following description is given in the order indicated below.

1. Functional Configuration of Information Processing Apparatus
2. Example Operation of Information Processing Apparatus
3. Example Applications
4. Example Effects 1. Functional Configuration of Information Processing Apparatus First, the functional configuration of an information processing apparatus according to an embodiment of the present invention will be described with reference to FIG. 1. FIG. 1 is a functional block diagram showing the configuration of an information processing apparatus according to an embodiment of the present invention.

The information processing apparatus 100 is a series identifier extracting apparatus with a function that extracts a series identifier for identifying a series of series content from the title of the content without requiring a priori knowledge. The expression "content" used here refers for example to a television or radio program, a movie, a newspaper or magazine article, or a book, but is not limited to such examples. The expression "series content" used in the present embodiment refers to content provided with some common intent, and it is assumed that the content in question includes a series name that is commonly used for installments in the series.

In addition, the series identifier extracted by the information processing apparatus 100 according to the present embodiment is a character string for identifying a series and does not need to be a word that has meaning. For example, series identifiers only need to make it possible to identify that content corresponds to installments in the same series when the series identifiers of such content are compared with one another. Accordingly, the series identifiers used in the present embodiment do not need to match the series name given by the content producer.

To realize the function described above, the information processing apparatus 100 mainly includes a title acquiring unit 102, a title analyzing unit 104, an evaluation value calculating unit 106, a mapping unit 108, an extraction criterion deciding unit 110, an extracting unit 112, an identifier generating unit 114, an identifier outputting unit 116, a feedback control unit 118, and a memory unit 120.

The title acquiring unit 102 has a function that acquires a title character string showing the title of a program or other content. For example, in the case of content that is a television program, the title acquiring unit 102 acquires a title character string by extracting a title character string from a title field of an SI/EPG (Service Information/Electronic Program Guide). Alternatively, when information is acquired from content information on the Internet, the title acquiring unit 102 acquires a title character string by extracting a character string surrounded by title tags (for example, <TITLE> tags) in HTML (HyperText Markup Language). As another alternative example, the title acquiring unit 102 acquires a title character string by extracting a character string surrounded by specified title tags from data in an RSS feed or an Atom feed.

The title analyzing unit 104 has a function that analyzes the title character string acquired by the title acquiring unit 102 and divides the title character string into a plurality of tokens from the analysis result. As the method used for such analysis, it is possible to use any method typically used to analyze character strings. If the number of tokens generated as a result of analysis is below a specified minimum number of tokens, the title analyzing unit 104 inputs the generated tokens into the identifier generating unit 114. For example, if the minimum number of tokens has been set in advance at three and the number of tokens generated as a result of the analysis is two, an extraction value calculating process, described later, and the like are not carried out for such title. Meanwhile, when the number of tokens generated as a result of the analysis is equal to or greater than the specified minimum number of tokens, the title analyzing unit 104 inputs the generated tokens into the evaluation value calculating unit 106.

The evaluation value calculating unit 106 has a function that calculates an evaluation value for each of the plurality of tokens obtained by dividing the title character string as a result of the analysis by the title analyzing unit 104. More specifically, the evaluation value calculating unit 106 calculates evaluation values by carrying out a sequence generating process, a noise removing process, and a weighting process on the plurality of tokens that are the analysis result of the title analyzing unit 104. Here, an "evaluation value" is a value used in the information processing apparatus 100 according to the present embodiment for evaluation when judging whether to extract a token for use as part of a series identifier. The evaluation value is calculated based on the character string length of a token. The evaluation value of a token is also calculated by weighting in accordance with the position of the token in the title character string. For example, the evaluation value may be a value produced by multiplying the character string length of a token by a weighting coefficient. Here, the weighting coefficient is a coefficient whose value increases the closer the token is positioned to the start of the title character string. If the character string length of a token is shorter than a specified minimum character string length, the evaluation value calculating unit 106 may exclude the token that is shorter than the specified minimum character string length from extraction without an evaluation value being calculated. For example, if the minimum character string length is set at three, tokens composed of one or two characters are excluded from extraction.

The mapping unit 108 has a function that maps, for each of the plurality of tokens for which evaluation values have been calculated by the evaluation value calculating unit 106, a token point whose position is shown by a value of an ordinal number showing the position of the token in the title character string and the value of the evaluation value calculated by the evaluation value calculating unit 106 onto a coordinate plane. As one example, the "ordinal numbers" referred to here are values produced by assigning numbers in order from the front to a sequence generated by the evaluation value calculating unit 106. Since the sequence generated by the evaluation value calculating unit 106 is a sequence where evaluation values corresponding to tokens have been stored in order from the first item starting with the token closest to the start of the title character string, the ordinal numbers are numbers that reflect the positions of the tokens in the title character string.

The extraction criterion deciding unit 110 has a function that decides the extraction criterion that is a criterion for extracting token points to be used as part of a series identifier that identifies a series out of the token points mapped onto the coordinate plane by the mapping unit 108. Here, the extraction criterion deciding unit 110 first decides the coordinates of a criterion point based on coordinates of token points mapped on the coordinate plane by the mapping unit 108. The criterion point should preferably be a point located in the vicinity of the mapped token points and positioned in a region between a point with the highest coordinate out of the token points and a point with the lowest coordinate. For example, the criterion point may have coordinates calculated as the average of the highest coordinates and the lowest coordinates. The extraction criterion deciding unit 110 then decides the extraction criterion based on the criterion point. For example, the extraction criterion deciding unit 110 may decide the extraction criterion based on a positional relationship on the coordinate plane between a criterion line with a specified gradient a that passes through the criterion point and the token points mapped by the mapping unit 108. More specifically, the extraction criterion deciding unit 110 may decide the extraction criterion so that each token point positioned above the criterion line on the coordinate plane is extracted. The expression "a token point positioned above the criterion line" refers to a token point with a large evaluation value compared to an evaluation value of a point on the criterion line at the same ordinal number as the token point.

The extracting unit 112 has a function for extracting token points in accordance with the extraction criterion decided by the extraction criterion deciding unit 110. That is, the extracting unit 112 judges whether the respective token points mapped by the mapping unit 108 conform to the extraction criterion decided by the extraction criterion deciding unit 110 and extracts token points that conform to the extraction criterion. The extracting unit 112 then outputs success/failure information, which shows whether extraction of token points that conform to the extraction criterion succeeded, to the feedback control unit 118. When doing so, the extracting unit 112 outputs success/failure information showing that the extraction of token points failed if the number of token points that conform to the extraction criterion is below a specified success/failure judgment value and success/failure information showing that the extraction of token points succeeded if the number of token points that conform to the extraction criterion is equal to or above the specified success/failure judgment value.

The identifier generating unit 114 has a function for generating a series identifier from the inputted tokens. The identifier generating unit 114 receives an input of tokens from either the title analyzing unit 104 or the extracting unit 112 and generates a series identifier by joining the character strings included in the inputted tokens.

The identifier outputting unit 116 has a function for outputting the series identifier generated by the identifier generating unit 114. The identifier outputting unit 116 is capable of outputting the series identifier to a suitable output destination in accordance with the functioning of the infoiination processing apparatus 100.

The feedback control unit 118 has a function for adjusting the value α of the gradient of the criterion line based on the success/failure information received from the identifier outputting unit 116. The feedback control unit 118 increases or decreases a success value showing the number of times the success/failure information has indicated that extraction succeeded and a failure value showing the number of times the success/failure information has indicated that extraction failed, and adjusts the gradient α of the criterion line if the success value has exceeded a specified success threshold or if the failure value has exceeded a specified failure threshold. The feedback control unit 118 adjusts the value α of the gradient of the criterion line by adding or subtracting a specified adjustment value to or from the value α of the gradient of the criterion line. When doing so, an addition adjustment value which is the adjustment value used when adding and a subtraction adjustment value which is the adjustment value used when subtracting may be different values. The feedback control unit 118 may set a gradient range in advance for the value α of the gradient of the criterion line and may reset the value α of the gradient of the criterion line to a specified initial value if an adjustment results in the value α of the gradient of the criterion line exceeding the gradient range.

The memory unit 120 is a storage apparatus that stores various parameters and the like used in processing by the various units of the information processing apparatus 100. The memory unit 120 may store a specified value α of the gradient of the criterion line, for example. As other examples, the memory unit 120 may also store values of the success value and the failure value. As yet another example, the memory unit 120 may also store values of the success threshold and the failure threshold. The extraction criterion deciding unit 110 and the feedback control unit 118, for example, are capable of acquiring such values by referring to the memory unit 120. The extraction criterion deciding unit 110 and the feedback control unit 118 may also update such values by writing into the memory unit 120.

2. Example Operation of Information Processing Apparatus

Figure 2:
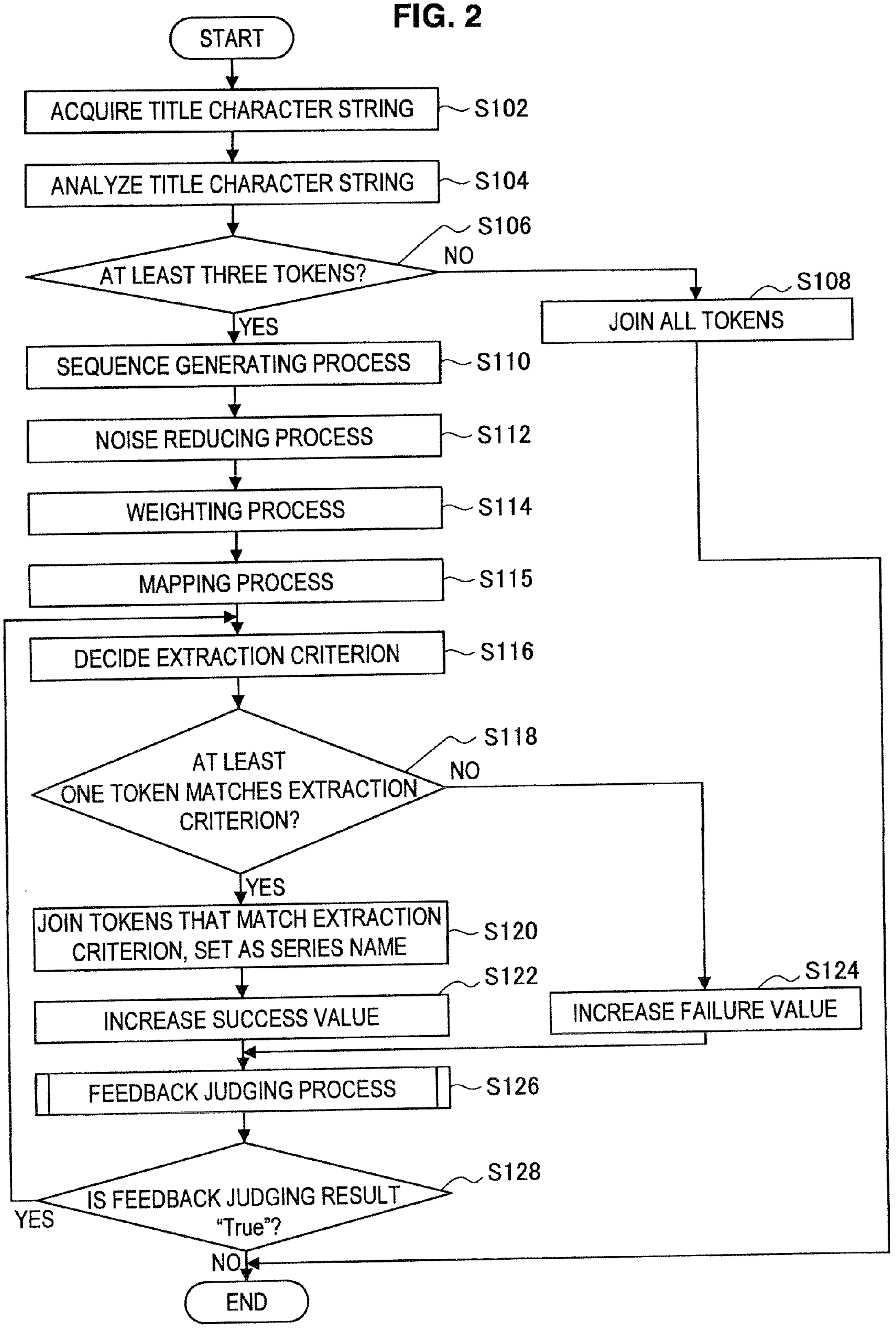
FIG. 2 is a flowchart showing one example of an information processing method according to the present embodiment.
Figure 3:
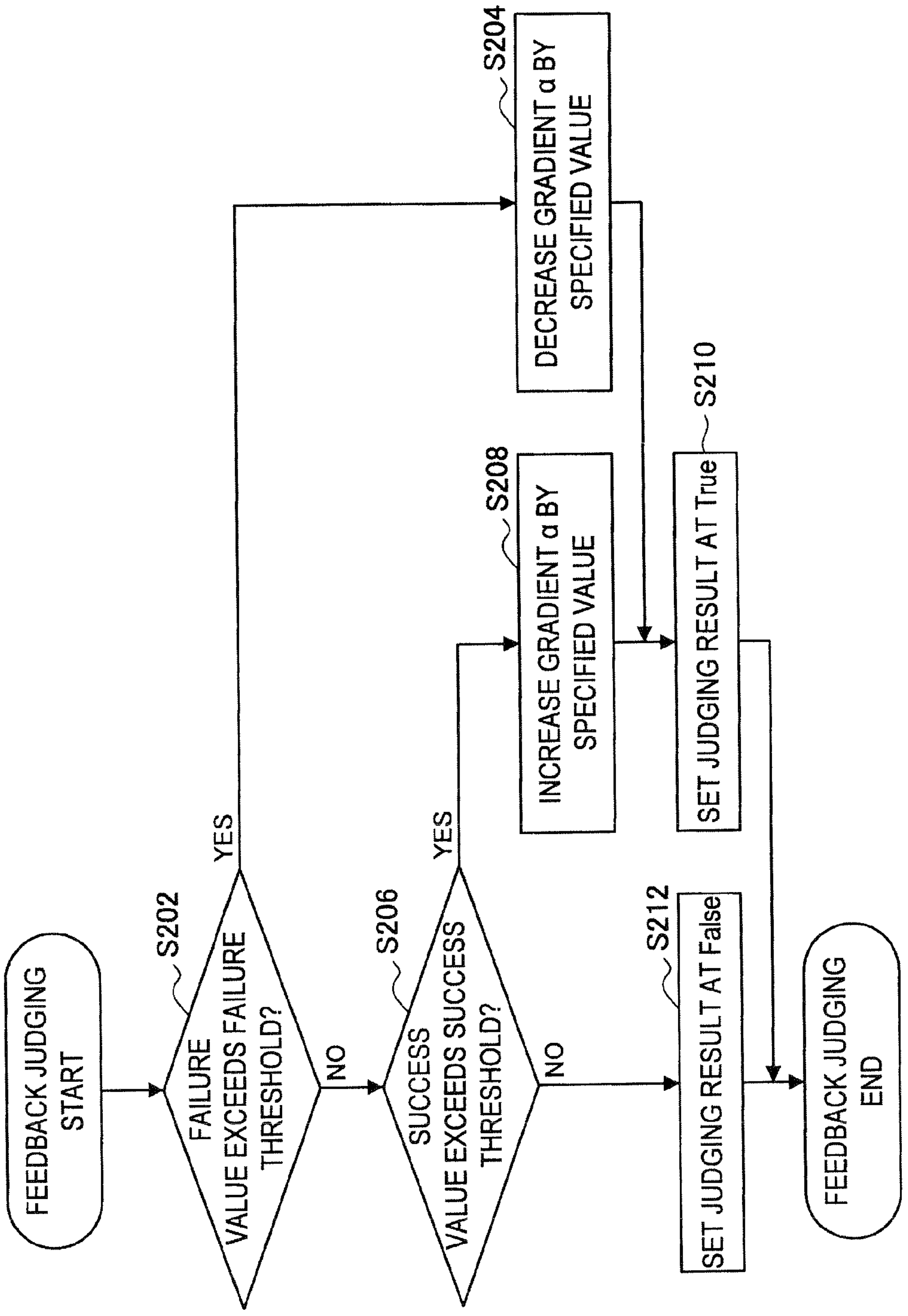
FIG. 3 is a sub-flowchart of a feedback judging process in the flowchart in FIG. 2.

Next, the information processing method realized by an operation of the information processing apparatus 100 will be described with reference to the flowcharts in FIGS. 2 and 3. FIG. 2 is a flowchart showing one example of an information processing method according to the present embodiment. FIG. 3 is a sub-flowchart showing the detailed flow of a feedback judging process of step S124 in the flowchart in FIG. 2.

Note that the explanation below describes the processing when, as a specific example, the following title character string is inputted into the information processing apparatus 100.

"(HD)(PG) Radio Favorites—Swallows (1) Something has Changed"

The names of the functional units of the information processing apparatus 100 that appear in this explanation are the same as in FIG. 1.

First, the title acquiring unit 102 of the information processing apparatus 100 acquires the title character string "(HD)(PG) Radio Favorites—Swallows (1) Something has Changed" from a title field of an SI/EPG (S102).

Next, as a result of the title analyzing unit 104 carrying out analysis on the title character string "(HD)(PG) Radio Favorites—Swallows (1) Something has Changed", the analysis result shown below is obtained.

"HD/PG/Radio/Favorites/Swallows/1/Something/has/Changed"

Here, the individual character strings that are separated by slashes (/) are tokens. The title analyzing unit 104 then judges whether three or more tokens have been generated as a result of the analysis (S106). If, at this point, the number of tokens is below three, the title analyzing unit 104 inputs the generated tokens into the identifier generating unit 114. The identifier generating unit 114 then generates the series identifier by joining all of the inputted tokens (S108).

In the present example, since the number of tokens generated as a result of the analysis is three or higher, the processing proceeds to an evaluation value calculating process by the evaluation value calculating unit 106. The evaluation value calculating process is divided into a sequence generating process (S110), a noise removing process (S112), and a weighting process (S114) in FIG. 2.

More specifically, in step S110, the evaluation value calculating unit 106 first carries out the sequence generating process on the analysis result "HD/PG/Radio/Favorites/Swallows/1/Something/has/Changed" of the title analyzing unit 104. That is, the evaluation value calculating unit 106 generates a character string length sequence whose items are numbers showing the character string lengths of the respective tokens. The character string length sequence obtained for the present example is shown below.

D={2,2,5,9,8,1,9,3,7}

Here, the evaluation value calculating unit 106 uses the character string lengths in keeping with a premise that the longer a character string that forms part of a title character string, the more important the meaning of such character string. Since it is important for a series name showing a series to function so as to identify the series, extremely short tokens, such as single- and two-character tokens, have a low probability of being able to identify a series. For this reason, the evaluation value calculating unit 106 reflects the character string lengths in the magnitudes of the evaluation values.

After this, the evaluation value calculating unit 106 removes noise from the character string length sequence D in step S112. More specifically, the evaluation value calculating unit 106 deletes values that are below a minimum character string length from the character string length sequence D={2, 2,5,9,8,1,9,3,7}. In the present example, since the minimum character string length is three, the evaluation value calculating unit 106 deletes items whose value is one or two from the character string length sequence D. This is in keeping with the premise described above that the longer a character string that forms part of a title character string, the more important the meaning of such character string. As can be understood from the example title used in the present embodiment, in some cases characters such as "(HD)" (indicating "High Definition", for example) that have no direct connection with the content of a media content are included in a title character string. By carrying out this noise removing process, the evaluation value calculating unit 106 is capable of removing the influence of noise that has no direct relationship on the content of a program or other content. The character string length sequence after noise removal is D={5,9,8,9,3,7}.

Next, the evaluation value calculating unit 106 also carries out the weighting process in step S114. More specifically, the evaluation value calculating unit 106 calculates weighting coefficients for the character string length sequence D after noise removal which is {5,9,8,9,3,7} and weights the character string length sequence D. In the present example, if the size of the character string length sequence after noise reduction (i.e., the total number of items) is expressed as s and an ordinal number is expressed as n, the weighting coefficients are expressed as $2^{s-n}$. In many cases, character strings corresponding to a series name in the title of a program or other content are located near the start of the title. For this reason, the weighting coefficients used here are coefficients set so that the closer an item is located to the first item in the character string length sequence, the larger the value of the weighting coefficient. After the character string length sequence D has been weighted using the weighting coefficients, it is possible to obtain an evaluation value sequence showing the evaluation values. In this example, the evaluation value sequence is given as {32×5, 16×9, 8×8, 4×9, 2×3, 1×7}.

Next, the mapping unit 108 maps token points whose positions are specified by a value of an ordinal number and an evaluation value onto a coordinate plane (S115). That is, if the x axis is used for ordinal numbers and the y axis is used for evaluation values, in the present example, the mapping unit 108 maps the six token points expressed by the coordinates (1,160), (2,144 ), (3,64), (4,36), (5,6), and (6,7) onto the coordinate plane.

Figure 4:
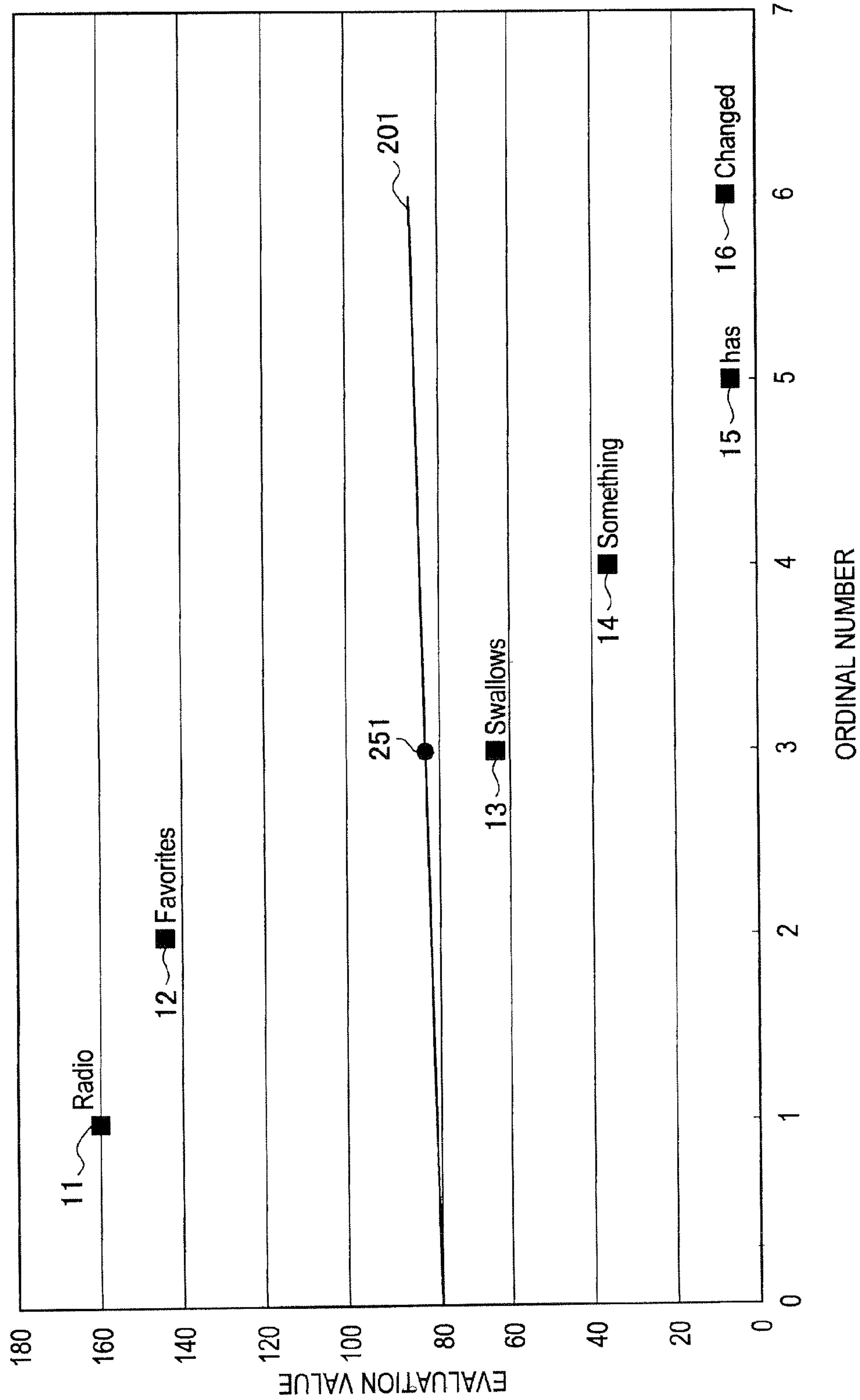
FIG. 4 is a diagram useful in showing one example of a coordinate plane on which ordinal numbers and evaluation values obtained by analyzing a first example of a title have been mapped.

Here, the coordinate plane onto which the token points have been mapped is shown in FIG. 4. FIG. 4 is a diagram showing one example of a coordinate plane on which ordinal numbers and evaluation values obtained by analyzing the title "HD/PG/Radio/Favorites/Swallows/1/Something/has/Changed" have been mapped. The coordinate plane shown in FIG. 4 includes six token points that have been mapped by the mapping unit 108. The coordinates of the token point 11 corresponding to the token "Radio" are (1, 160). The coordinates of the token point 12 corresponding to the token "Favorites" are (2, 144). The coordinates of the token point 13 corresponding to the token "Swallows" are (3, 64). The coordinates of the token point 14 corresponding to the token "Something" are (4, 36). The coordinates of the token point 15 corresponding to the token "has" are (5, 6). The coordinates of the token point 16 corresponding to the token "Changed" are (6, 7).

Once the ordinal numbers and evaluation values have been mapped onto the coordinate space, the extraction criterion deciding unit 110 next decides the extraction criterion that is a criterion for extracting a series identifier (S116). The extraction criterion deciding unit 110 first decides a criterion point for extracting a series identifier. As one example, the criterion point may be a point with average coordinates between the highest coordinates and lowest coordinates out of the coordinates of the token points that have been mapped. The highest coordinates and the lowest coordinates referred to here may be decided based on the values of the evaluation values. For example, in the example in FIG. 4, a point whose coordinate is the average of the token point 11 that has the highest coordinate and a token point 15 that has the lowest coordinate is set as the criterion point 251. In this case, the coordinates of the criterion point 251 are (3,83). The extraction criterion deciding unit 110 next draws a criterion line 201 that passes through the criterion point 251 and whose gradient is the specified value α. After this, an extraction criterion for extracting the token points that are positioned above the criterion line 201 is decided.

Once the extraction criterion is decided, the extracting unit 112 extracts token points that conform to the decided extraction criterion. After this, the extracting unit 112 judges whether the number of tokens that conform to the extraction criterion is equal to or above the success/failure judgment value (S118). In the present example, the success/failure judgment value is set at one. When, in the judgment in step S118, the number of tokens that conform to the extraction criterion is one or greater, the extracting unit 112 inputs the extracted token points into the identifier generating unit 114. The identifier generating unit 114 then joins the character strings included in the tokens associated with the token points inputted from the extracting unit 112 to generate a series identifier (S120). In addition, the extracting unit 112 inputs success/failure information showing that the extraction succeeded into the feedback control unit 118. Meanwhile, if in the judgment in step S118, the number of tokens that conform to the extraction criterion is not one or greater, the extracting unit 112 inputs success/failure information showing that the extraction failed into the feedback control unit 118.

As one example, for the example in FIG. 4, the extracting unit 112 extracts token points positioned above the criterion line 201 that passes through the criterion point 251 and has a gradient with a specified value α (in the present example, it is assumed that α=1). For example, if the criterion line is a line shown by the expression y=x+80, since the token point 11 has a larger y value (which is a value corresponding to the evaluation value) than a point (1, 81) present on the criterion line 201 at the x=1 position, it is judged that the token point 11 is positioned above the criterion line 201 and is a token point that conforms to the extraction criterion. It is then judged in the same way whether the token points 12 to 17 conform to the extraction criterion, and as a result, the token points 11 and 12 are extracted as points that conform to the extraction criterion. This means that in the present example, the identifier generating unit 114 extracts the character string "RadioFavorites" as the series identifier.

The feedback control unit 118 receives the success/failure information from the extracting unit 112, and if the received success/failure information shows that the extraction succeeded, increases the success value (S122). Meanwhile, if the received success/failure information shows that the extraction failed, the feedback control unit 118 increases the failure value (S124). Next, the feedback control unit 118 carries out the feedback judgment process using the success value and failure value (S126).

The detailed processing of the feedback judgment process will now be described with reference to FIG. 3. FIG. 3 is a sub-flowchart showing the detailed processing of the feedback judgment process in the flowchart in FIG. 2.

First, the feedback control unit 118 judges whether the failure value has exceeded the failure threshold (S202). Here, the failure threshold is a value set in advance and as one example is a value stored in the memory unit 120. If in the judgment in step S202, the failure value has exceeded the failure threshold, the feedback control unit 118 subtracts a specified adjustment value from the gradient a of the criterion line to adjust the value α of the gradient of the criterion line. The feedback control unit 118 then sets the result of the feedback judgment in this case at "True" (S210).

Meanwhile, if in the judgment in step S202, the failure value does not exceed the failure threshold, the feedback control unit 118 judges whether the success value has exceeded the success threshold (S206). If in the judgment in step S206, the success value has exceeded the success threshold, the feedback control unit 118 adds a specified adjustment value to the value of the gradient a of the criterion line to adjust the value α of the gradient of the criterion line. The feedback control unit 118 then sets the result of the feedback judgment in this case at "True" (S210).

Meanwhile, if in the judgment in step S206, the success value does not exceed the success threshold, that is, when neither the success value nor the failure value exceeds a specified threshold, the feedback control unit 118 does not adjust the value α of the gradient of the criterion line and sets the result of the feedback judgment at "False".

The explanation now returns to FIG. 2. A feedback judgment result is outputted by carrying out the feedback judgment process in step S126, and the feedback control unit 118 next judges whether the outputted feedback judgment result is "True" (S128). If in the judgment in step S128, the feedback judgment result is "True", that is, when the feedback judgment result shows that the value α of the gradient of the criterion line has been adjusted, the processing returns to the process deciding the extraction criterion in step S116. Meanwhile, if in the judgment in step S128, the feedback judgment result is not "True", the information processing apparatus 100 ends the series identifier extracting process.

3. Example Applications

Figure 5:
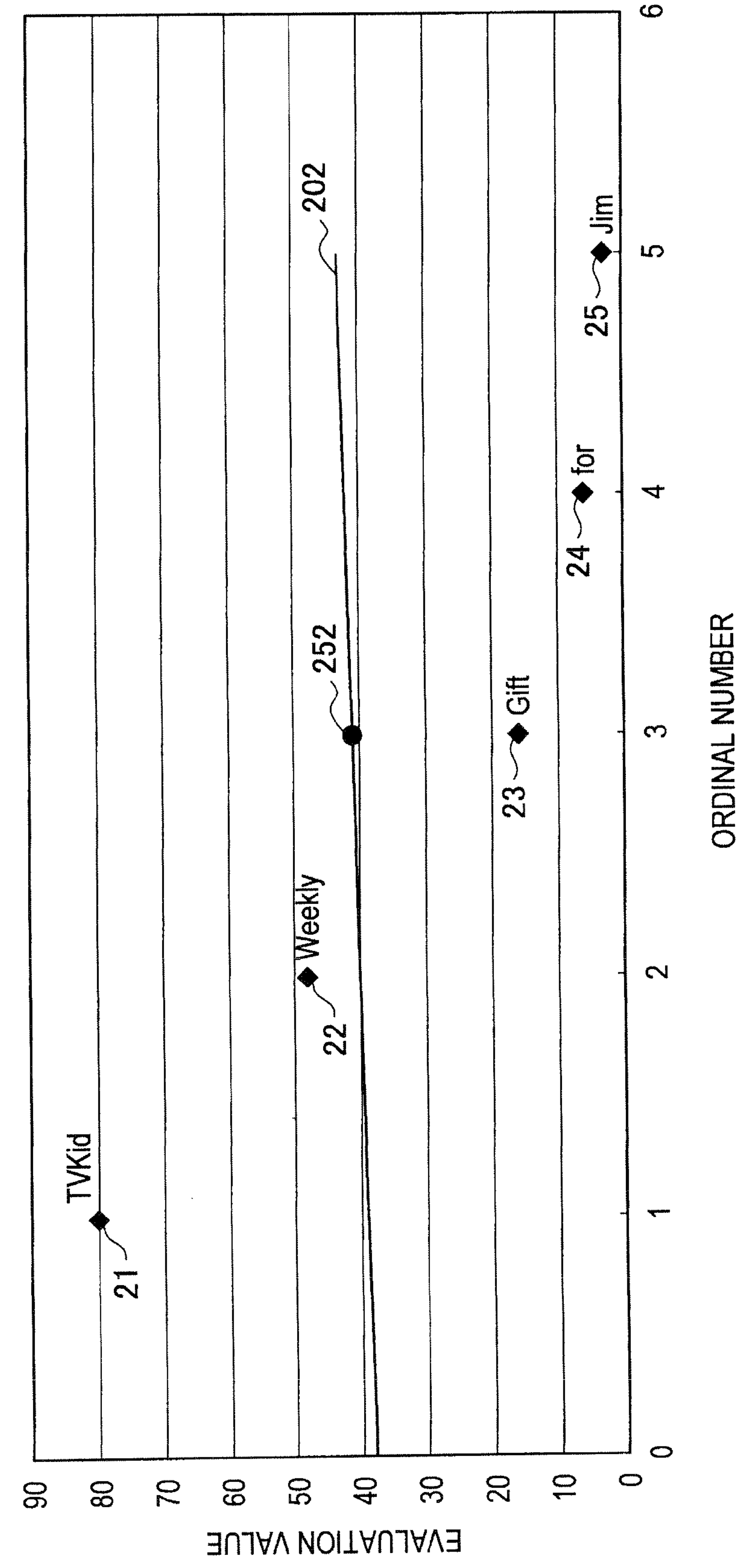
FIG. 5 is a diagram useful in showing another example of a coordinate plane on which ordinal numbers and evaluation values obtained by analyzing a second example of a title have been mapped.
Figure 6:
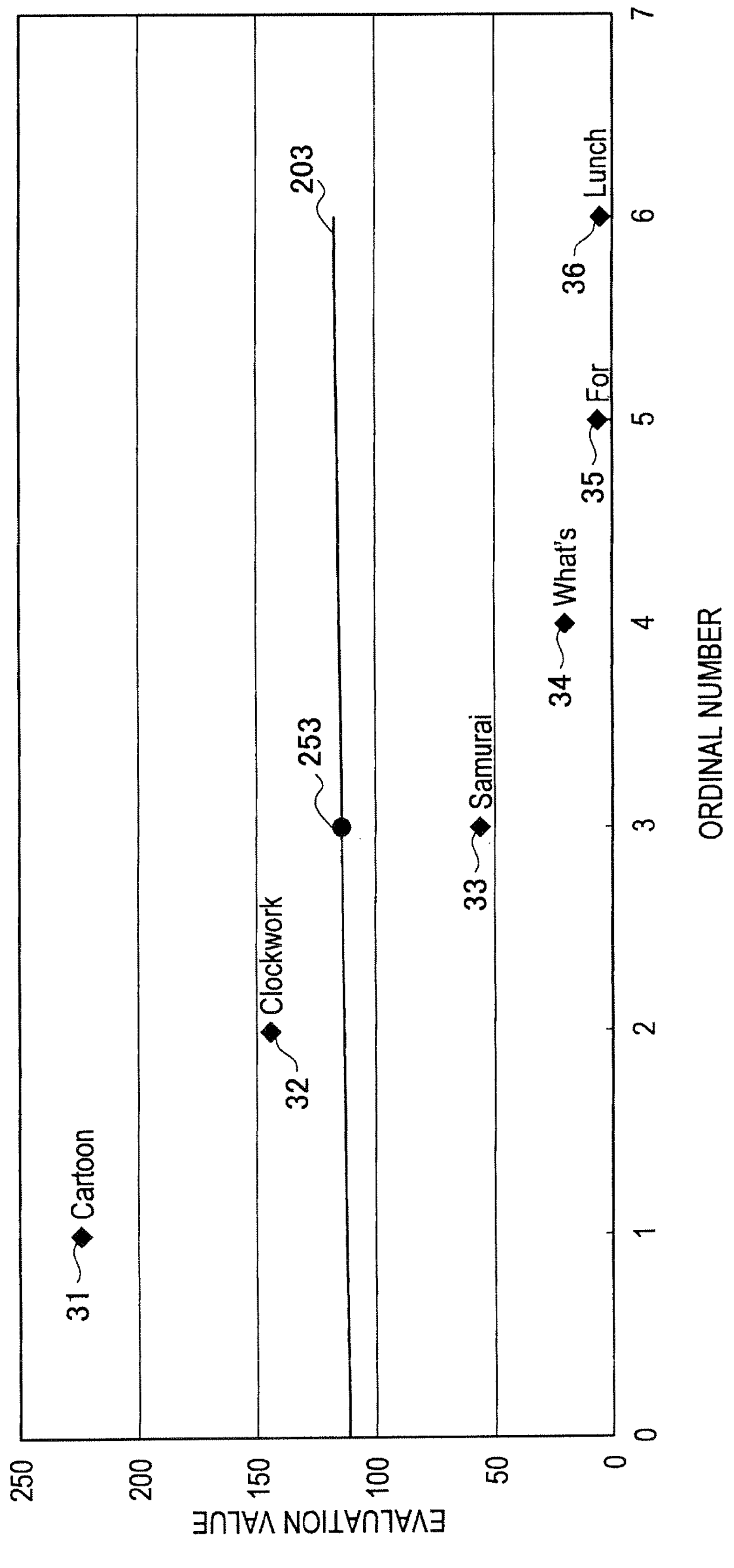
FIG. 6 is a diagram useful in showing yet another example of a coordinate plane on which ordinal numbers and evaluation values obtained by analyzing a third example of a title have been mapped.
Figure 7:
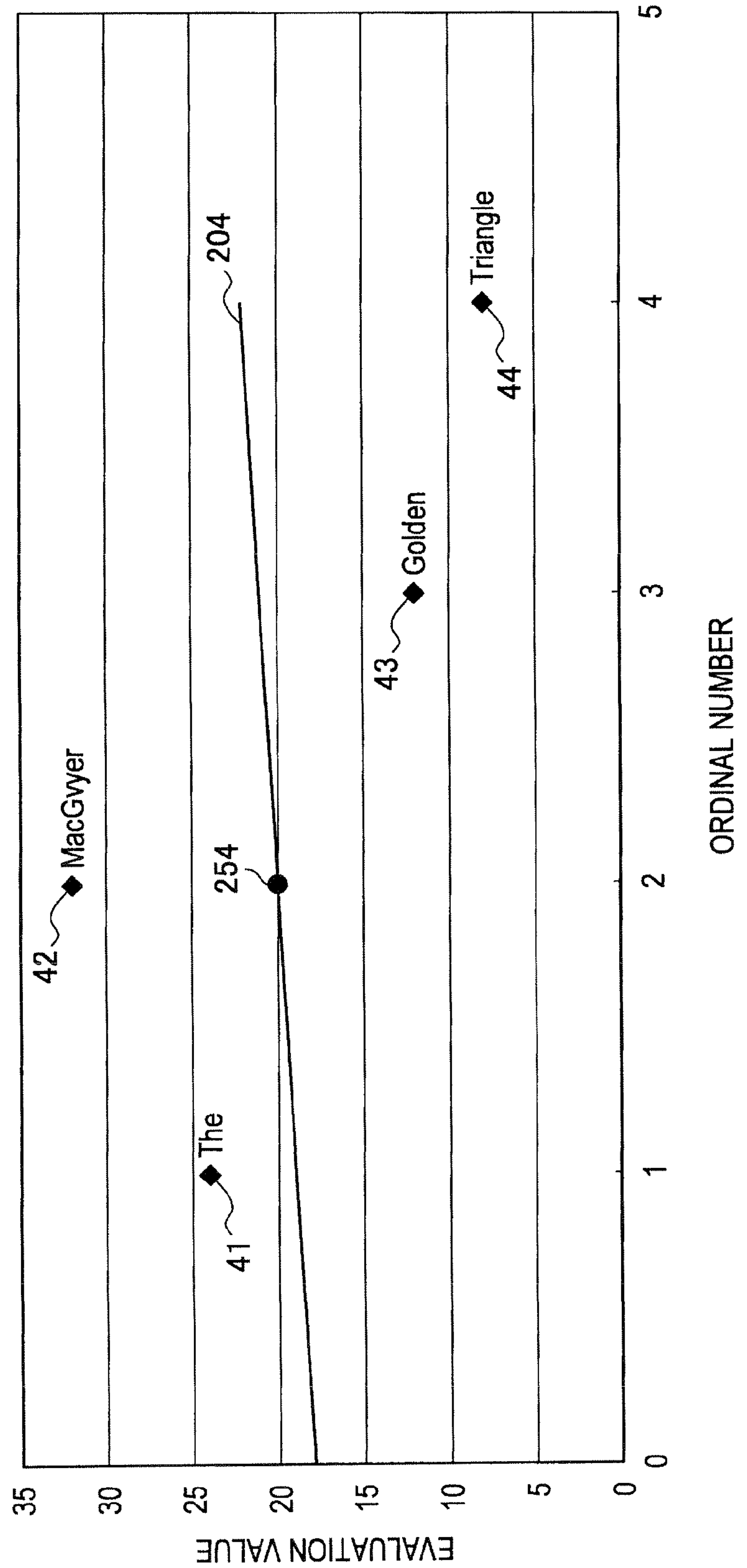
FIG. 7 is a diagram useful in showing yet another example of a coordinate plane on which ordinal numbers and evaluation values obtained by analyzing a fourth example of a title have been mapped.
Figure 8:
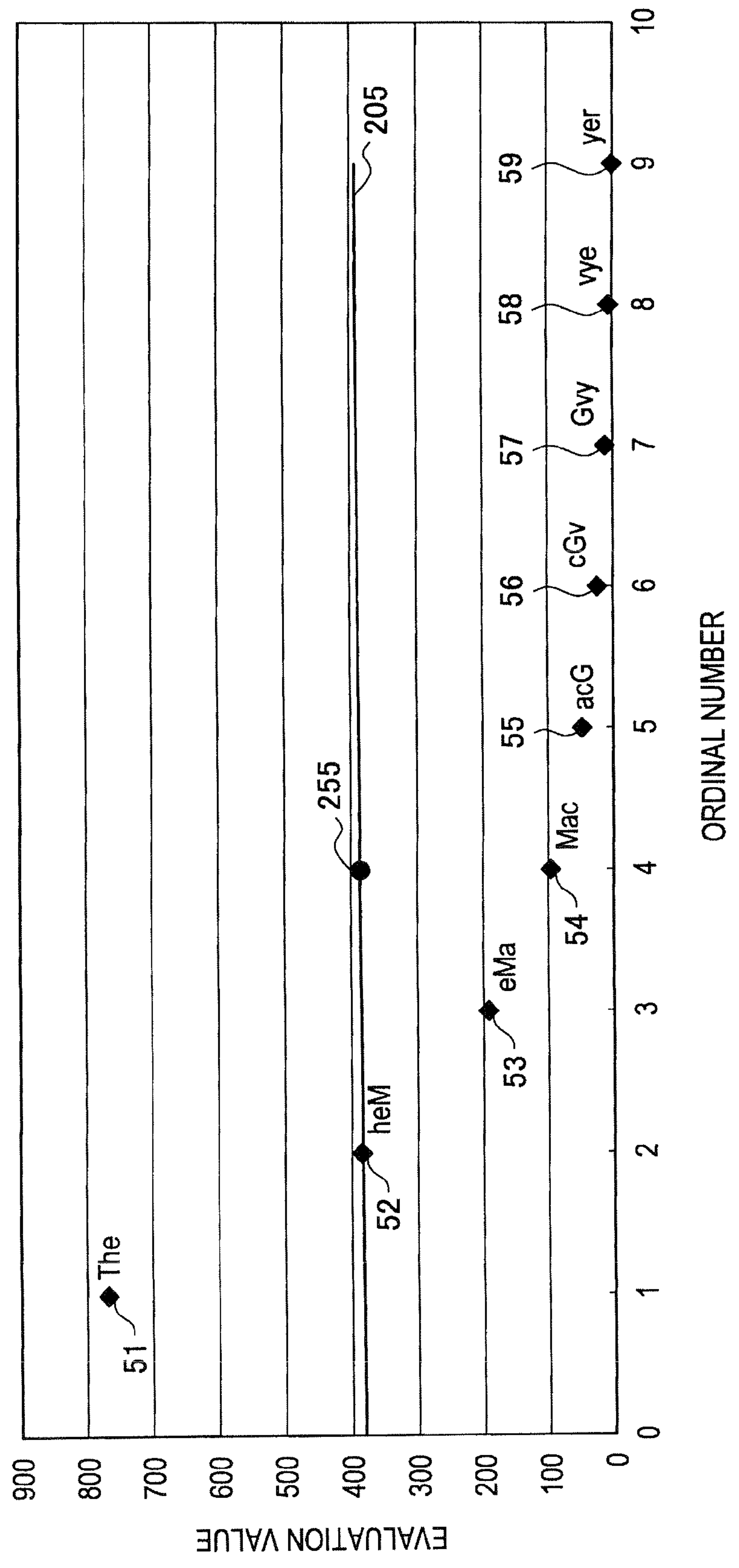
FIG. 8 is a diagram useful in showing one example of a coordinate plane on which ordinal numbers and evaluation values obtained by analyzing the same title in FIG. 7 using 3-gram analysis have been mapped

Next, other examples of series identifier extraction by the information processing apparatus 100 according to the present embodiment will be described with reference to FIGS. 5 to 8. FIG. 5 is a diagram showing another example of a coordinate plane on which ordinal numbers and evaluation values obtained by analyzing the title "TVKid Weekly—A Gift for Jim" have been mapped. FIG. 6 is a diagram showing another example of a coordinate plane on which ordinal numbers and evaluation values obtained by analyzing the title "Cartoon—Clockwork Samurai—What's for Lunch?" have been mapped. FIG. 7 is a diagram showing another example of a coordinate plane on which ordinal numbers and evaluation values obtained by analyzing the title "The MacGvyer (2) Golden Triangle" have been mapped. FIG. 8 is a diagram useful in showing one example of a coordinate plane on which ordinal numbers and evaluation values obtained by analyzing the same title in FIG. 7 using 3-gram analysis have been mapped.

First, an example of series identifier extraction for the case where the title acquiring unit 102 has acquired "TVKid Weekly—A Gift for Jim" as the title character string will be described. Note that since the detailed processing in the operation described below is the same as that described earlier, no further explanation is given and the description instead focuses on the values of the parameters calculated during the series identifier extraction process and the result of such process.

When the title character string "TVKid Weekly—A Gift for Jim" is analyzed by the title analyzing unit 104, the title character string is divided into a plurality of tokens as shown below.

"TVKid/Weekly/A/Gift/for/Jim"

The character string length sequence calculated by the evaluation value calculating unit 106 based on the character string lengths of such tokens is as follows.

{5,6,1,4,3,3}

After the evaluation value calculating unit 106 has carried out the noise removing process, the following character string length sequence is obtained from the character string length sequence given above.

{5,6,4,3,3}

When the evaluation value calculating unit 106 carries out weighting on this character string length sequence using the weighting coefficients, the following evaluation value sequence is obtained.

{80,48,16,6,3}

A coordinate plane where the token points have been mapped from this evaluation value sequence by the mapping unit 108 is shown in FIG. 5. The coordinate plane shown in FIG. 5 includes five tokens. The coordinates of the token point 21 corresponding to the token "TVKid" are (1,80). The coordinates of the token point 22 corresponding to the token "Weekly" are (2, 48). The coordinates of the token point 23 corresponding to the token "Gift" are (3, 16). The coordinates of the token point 24 corresponding to the token "for" are (4, 6). The coordinates of the token point 25 corresponding to the token "Jim" are (5, 3).

In this case, the coordinates of the criterion point 252 are (3, 41) and the criterion line 202 is a line shown by the expression y=x+38. Here, it is judged whether the respective token points conform to the extraction criterion in the same way as described above, and the token points 21 and 22 are extracted. As a result, the series identifier is given as "TVKid-Weekly".

Next, an example of series identifier extraction for the case where the title acquiring unit 102 has acquired "Cartoon—Clockwork Samurai—What's for Lunch?" as the title character string will be described. When the title character string "Cartoon—Clockwork Samurai—What's for Lunch?" is analyzed by the title analyzing unit 104, the title character string is divided into a plurality of tokens as shown below.

"Cartoon/Clockwork/Samurai/What's/for/Lunch"

The character string length sequence calculated by the evaluation value calculating unit 106 based on the character string lengths of such tokens is as follows.

{7,9,7,5,3,5}

After the evaluation value calculating unit 106 has carried out the noise removing process, the following character string length sequence is obtained from the character string length sequence given above.

{7,9,7,5,3,5}

When the evaluation value calculating unit 106 carries out weighting on this character string length sequence using the weighting coefficients, the following evaluation value sequence is obtained.

{224,144,56,20,6,5}

A coordinate plane where the token points have been mapped from this evaluation value sequence by the mapping unit 108 is shown in FIG. 6. The coordinate plane shown in FIG. 6 includes six tokens. The coordinates of the token point 31 corresponding to the token "Cartoon" are (1, 224). The coordinates of the token point 32 corresponding to the token "Clockwork" are (2, 144). The coordinates of the token point 33 corresponding to the token "Samurai" are (3, 56). The coordinates of the token point 34 corresponding to the token "What's" are (4, 20). The coordinates of the token point 35 corresponding to the token "for" are (5, 6). The coordinates of the token point 36 corresponding to the token "Lunch" are (6, 5).

In this case, the coordinates of the criterion point 253 are (3,114) and the criterion line 203 is a line shown by the expression y=x+111. Here, it is judged whether the respective token points conform to the extraction criterion in the same way as described above, and the token points 31 and 32 are extracted. As a result, the series identifier is given as "CartoonClockwork".

Next, an example of series identifier extraction when the title acquiring unit 102 has acquired "The MacGvyer (2) Golden Triangle" as the title character string will be described. If the title character string "The MacGvyer (2) Golden Triangle" is analyzed by the title analyzing unit 104, the title character string is divided into a plurality of tokens as shown below.

"The/MacGvyer/2/Golden/Triangle"

The character string length sequence calculated by the evaluation value calculating unit 106 based on the character string lengths of the tokens is as follows.

{3,8,1,6,8}

When the noise reduction process is carried out by the evaluation value calculating unit 106, the following character string length sequence is obtained from the above character string length sequence.

{3,8,6,8}

When the evaluation value calculating unit 106 carries out weighting on this character string length sequence using the weighting coefficients, the following evaluation value sequence is obtained.

{24,32,12,8}

A coordinate plane where the mapping unit 108 has mapped token points from this evaluation value sequence onto a coordinate plane is shown in FIG. 7. The coordinate plane shown in FIG. 7 includes four tokens. The coordinates of the token point 41 corresponding to the token "The" are (1,24). The coordinates of the token point 42 corresponding to the token "MacGvyer" are (2,32). The coordinates of the token point 43 corresponding to the token "Golden" are (3,12). The coordinates of the token point 44 corresponding to the token "Triangle" are (4,8).

Here, the coordinates of the criterion point 254 are (2,20) and the criterion line 204 is a line shown by the expression y=x+18. Here, it is judged whether the respective token points conform to the extraction criterion in the same way as described above, and the token points 41 and 42 are extracted. As a result, the series identifier is given as "TheMacGvyer".

Next, an example of series identifier extraction when the title acquiring unit 102 acquires "The MacGvyer (2) Golden Triangle" as the title character string and 3-gram analysis is used as the analysis method will be described. When the title character string "The MacGvyer (2) Golden Triangle" is analyzed by the title analyzing unit 104 using 3-gram analysis, the title character string is divided into a plurality of tokens as shown below.

"The/heM/eMa/Mac/acG/cGv/Gvy/vye/yer"

The character string length sequence calculated by the evaluation value calculating unit 106 based on the character string lengths of the tokens is as follows.

{3,3,3,3,3,3,3,3,3,1}

When the noise reduction process is carried out by the evaluation value calculating unit 106, the following character string length sequence is obtained from the above character string length sequence.

{3,3,3,3,3,3,3,3,3}

When the evaluation value calculating unit 106 carries out weighting on the character string length sequence using the weighting coefficients, the following evaluation value sequence is obtained.

{768,384,192,96,48,24,12,6,3}

A coordinate plane on which token points have been mapped from this evaluation value sequence by the mapping unit 108 is shown in FIG. 8. The coordinate plane shown in FIG. 8 includes nine token points. The coordinates of the token point 51 corresponding to the token "The" are (1,768). The coordinates of the token point 52 corresponding to the token "heM" are (2,384). The coordinates of the token point 53 corresponding to the token "eMa" are (3,192). The coordinates of the token point 54 corresponding to the token "Mac" are (4,96). The coordinates of the token point 55 corresponding to the token "acG" are (5,48). The coordinates of the token point 56 corresponding to the token "cGv" are (6,24). The coordinates of the token point 57 corresponding to the token "Gvy" are (7,12). The coordinates of the token point 58 corresponding to the token "vye" are (8,6). The coordinates of the token point 59 corresponding to the token "yer" are (9,3).

Here, the coordinates of the criterion point 255 are (4,385) and the criterion line is a line shown by the expression y=x+381. Here, it is judged whether the respective token points conform to the extraction criterion in the same way as described above, and the token points 51 and 52 are extracted. As a result, the series identifier is given as "TheheM".

4. Example Effects

As described above, according to the information processing apparatus 100 according to an embodiment of the present invention, it is possible to extract a series identifier for identifying a series from a title character string of a program or other content. Here, by analyzing the title character string of a program or other content, the title character string is divided into a plurality of tokens. After this, evaluation values are calculated for each token based on the character string length and ordinal number of the token and the tokens to be extracted as part of the series identifier are decided based on the evaluation values. By joining the extracted tokens, the series identifier is generated. That is, the longer the length of the character string of a token, the larger the evaluation value and the closer a token is positioned to the start of the title character string, the larger the evaluation value. This means that the longer the character string length of a token and the closer the position of the token to the start, the more likely such token will be used as part of a series identifier. Since in many cases, a series name is inserted at a position near the start of a title character string, there is an effect that it becomes easier to extract a character string expressing a series. At this time, since a priori knowledge such as a dictionary is not required to extract a series identifier, there are effects in that it is not necessary to consider the updating of a priori knowledge and that it is not necessary to prepare new a priori knowledge when the present invention is applied to a different language.

In addition, by using a configuration that feeds back results into the value $\alpha$ of the gradient of the criterion line used as an extraction criterion, it is possible to automatically adjust the extraction criterion to appropriate numeric values. Although such values may differ from language to language, it is possible to handle new languages by merely adjusting the numeric values, which is preferable in that it is not necessary to prepare a priori knowledge or to provide a program itself for each language as in the past.

Note that the functions of the respective units of the information processing apparatus 100 described in the above embodiment are achieved in reality by a computational device such as a CPU (Central Processing Unit), not shown, reading a control program in which processing procedures for realizing the various functions are written from a storage medium such as a ROM (Read Only Memory) or RAM (Random Access Memory) that stores the control program, and interpreting and executing the control program. For example, in the information processing apparatus 100 according to the embodiment described above, the respective functions of the title acquiring unit 102, the title analyzing unit 104, the evaluation value calculating unit 106, the mapping unit 108, the extraction criterion deciding unit 110, the extracting unit 112, the identifier generating unit 114, and the feedback control unit 118 are achieved in reality by a CPU carrying out a program in which processing procedures for realizing such functions are written.

Although preferred embodiments of the present invention have been described in detail with reference to the attached drawings, the present invention is not limited to the above examples. It should be understood by those skilled in the art that various modifications, combinations, sub-combinations and alterations may occur depending on design requirements and other factors insofar as they are within the scope of the appended claims or the equivalents thereof.

Also, although the feedback control unit adds a specified adjustment value to the value of the gradient of the criterion line or subtracts a specified adjustment value from the value of the gradient of the criterion line in the embodiment described above, the present invention is not limited to this example. For example, the feedback control unit may adjust the value of the gradient of the criterion line by multiplying the value of the gradient of the criterion line by a specified adjustment value or by dividing the value of the gradient of the criterion line by a specified adjustment value.

Also, although the feedback control unit adjusts the value of the gradient of the criterion line if the success value exceeds the success threshold or if the failure value exceeds the failure threshold based on the success/failure information in the embodiment described above, the present invention is not limited to this example. For example, the feedback control unit may adjust the value of the gradient of the criterion line if the success/failure information shows that the extraction has succeeded consecutively for a certain number of times or more or if the success/failure information shows that the extraction has failed consecutively for a certain number of times or more.

Note that in the present specification, the steps written in the flowchart may of course be processed in chronological order in accordance with the stated order, but may not necessarily be processed in the chronological order, and may be processed individually or in a parallel manner. It is needless to say that, in the case of the steps are processed in the chronological order, the order of the steps may be changed appropriately according to circumstances.

The present application contains subject matter related to that disclosed in Japanese Priority Patent Application JP 2010-024585 filed in the Japan Patent Office on Feb. 5, 2010, the entire content of which is hereby incorporated by reference.

What is claimed is:

1. An information processing apparatus comprising:

at least one processor configured to:

acquire a title character string showing a title of content;

analyze the title character string and divide the title character string into a plurality of tokens;

calculate, for each of the plurality of tokens, an evaluation value that is based on a character string length of the token and is weighted in accordance with a position of the token in the title character string;

map, for each of the plurality of tokens, a token point, whose position is shown by a value of an ordinal number showing the position of the token in the title character string and the evaluation value, onto a coordinate plane;

decide, based on coordinates of the token points mapped onto the coordinate plane, coordinates of a criterion point used as a criterion for extracting an identifier that identifies a series from the title and an extraction criterion based on the criterion point;

extract token points that conform to the extraction criterion out of the token points; and generate the identifier from the character strings included in tokens associated with the token points.

2. An information processing apparatus according to claim 1, wherein the at least one processor is further configured to decide the extraction criterion based on a positional relationship between a criterion line, which passes through the criterion point on the coordinate plane and has a specified gradient, and coordinates of the token points.

3. An information processing apparatus according to claim 2, wherein the at least one processor is further configured to:

weight each evaluation value using a weighting coefficient whose value is higher the lower the ordinal number of a token, and decide the extraction criterion so as to extract token points whose evaluation values are large compared to points on the criterion line.

4. An information processing apparatus according to claim 1, wherein the at least one processor is further configured to:

output success/failure information showing whether extraction of token points that conform to the extraction criterion succeeded, and adjust a value of a gradient of the criterion line based on the success/failure information.

5. An information processing apparatus according to claim 4, wherein the at least one processor is further configured to output the success/failure information when a number of token points that match the extraction criterion is below a specified success/failure judgment value, to judge that extraction of the token points failed.

6. An information processing apparatus according to claim 4, wherein the at least one processor is further configured to adjust the value of the gradient of the criterion line by one of adding a specified adjustment value to and subtracting a specified adjustment value from the value of the gradient of the criterion line.

7. An information processing apparatus according to claim 4, wherein the at least one processor is further configured to adjust the value of the gradient of the criterion line by one of multiplying and dividing the value of the gradient of the criterion line by a specified adjustment value.

8. An information processing apparatus according to claim 4, wherein the at least one processor is further configured to increase and decrease a success value and a failure value respectively in accordance with a number of times the success/failure information shows that extraction succeeded and a number of times the success/failure information shows that extraction failed when the success value exceeds a specified success threshold or when the failure value exceeds a specified failure threshold, to adjust the value of the gradient of the criterion line.

9. An information processing apparatus according to claim 4, wherein the at least one processor is further configured to adjust the value of the gradient of the criterion line when the success/failure information shows that extraction has succeeded consecutively for at least a certain number of times or more or when the success/failure information shows that extraction has failed consecutively for at least a certain number of times, to adjust the value of the gradient of the criterion line.

10. An information processing apparatus according to claim 4, wherein the at least one processor is further configured to adjust the value of the gradient of the criterion line when an adjustment results in the value of the gradient of the criterion line exceeding a specified gradient range, to set the value of the gradient of the criterion line at a specified initial value.

11. An information processing apparatus according to claim 1, wherein the at least one processor is further configured to calculate the evaluation value when a character string length of a token is shorter than a specified minimum character string length, to omit calculation of the evaluation value and exclude the token from extraction.

12. An information processing apparatus according to claim 1, wherein the at least one processor is further configured to:

analyze the title character string and divide the title character string into the plurality of tokens when a number of tokens generated as a result of analysis is below a specified minimum number of tokens, to output the generated tokens, and generate the identifier by combining the tokens.

13. An information processing method, the method comprising:

using a processor:

acquiring a title character string showing a title of content;

analyzing the acquired title character string and dividing the title character string into a plurality of tokens;

calculating, for each of the plurality of tokens, an evaluation value that is based on a character string length of the token and is weighted in accordance with a position of the token in the title character string;

mapping, for each of the plurality of tokens, a token point, whose position is shown by a value of an ordinal number showing the position of the token in the title character string and the evaluation value, onto a coordinate plane;

deciding, based on coordinates of the token points mapped onto the coordinate plane, coordinates of a criterion point used as a criterion for extracting an identifier that identifies a series from the title and an extraction criterion based on the criterion point;

extracting token points that conform to the extraction criterion out of the token points; and generating the identifier from the character strings included in tokens associated with the token points.

14. A non-transitory computer readable storage medium having instructions stored thereon, which, when executed by a processor, perform an information processing method, the method comprising:

acquiring a title character string showing a title of content;

analyzing the acquired title character string and dividing the title character string into a plurality of tokens;

calculating, for each of the plurality of tokens, an evaluation value that is based on a character string length of the token and is weighted in accordance with a position of the token in the title character string;

mapping, for each of the plurality of tokens, a token point, whose position is shown by a value of an ordinal number showing the position of the token in the title character string and the evaluation value, onto a coordinate plane;

deciding, based on coordinates of the token points mapped onto the coordinate plane, coordinates of a criterion point used as a criterion for extracting an identifier that identifies a series from the title and an extraction criterion based on the criterion point;

extracting token points that conform to the extraction criterion out of the token points; and generating the identifier from the character strings included in tokens associated with the token points.

* * * * *